(12) United States Patent
Hauger et al.

(10) Patent No.: US 7,400,409 B2
(45) Date of Patent: Jul. 15, 2008

(54) COHERENCE MICROSCOPE USING INTERFERENCE OF TIME INCOHERENT LIGHT TO ACHIEVE DEPTH RESOLUTION IN A MEASUREMENT SPECIMEN

(75) Inventors: Christoph Hauger, Aalen (DE); Hans-Joachim Miesner, Oberkochen (DE); Ludwin Monz, Mainz (DE)

(73) Assignee: Carl Zeiss AG (DE)

( * ) Notice: Subject to any disclaimer, the term of this patent is extended or adjusted under 35 U.S.C. 154(b) by 146 days.

(21) Appl. No.: 10/538,587

(22) PCT Filed: Dec. 16, 2003

(86) PCT No.: PCT/EP03/14323

§ 371 (c)(1),
(2), (4) Date: Oct. 3, 2005

(87) PCT Pub. No.: WO2004/055570

PCT Pub. Date: Jul. 1, 2004

(65) Prior Publication Data

US 2006/0056784 A1   Mar. 16, 2006

(30) Foreign Application Priority Data

Dec. 17, 2002  (DE) .................................. 102 60 887

(51) Int. Cl.
 *G01B 9/02* (2006.01)
(52) U.S. Cl. ...................................... 356/479
(58) Field of Classification Search ................. 356/477, 356/479; 250/227.19, 227.27
See application file for complete search history.

(56) References Cited

U.S. PATENT DOCUMENTS

| | | | |
|---|---|---|---|
| 3,013,467 A | 12/1961 | Minsky | |
| 5,666,195 A * | 9/1997 | Shultz et al. | ................ 356/519 |
| 5,877,856 A | 3/1999 | Fercher | |
| 6,327,463 B1 | 12/2001 | Welland | |
| 6,396,587 B1 | 5/2002 | Knupfer et al. | |
| 6,788,861 B1 * | 9/2004 | Utsui et al. | ................ 385/119 |
| 2002/0085208 A1 * | 7/2002 | Hauger et al. | ............... 356/479 |

FOREIGN PATENT DOCUMENTS

| | | |
|---|---|---|
| JP | 11-56751 | 3/1999 |
| WO | WO 97/32182 | 9/1997 |
| WO | WO 98/52021 | 11/1998 |

OTHER PUBLICATIONS

Tearney et al. "In Vivo Endoscopic Optical Biopsy with Optical Coherence Tomography"—Science, vol. 276, Jun. 27, 1997, pp. 2037-2039.
Publication of Sabharwal et al. "Slit-scanning confocal microendoscope for high-resolution in vivo imaging", Applied Optics, vol. 38, No. 34, pp. 7133-7144.
Windecker et al. "Low-coherence fiber-optic sensor with a large numerical aperture for topographic measurement", Jul. 1, 1998.

* cited by examiner

*Primary Examiner*—Michael A Lyons
(74) *Attorney, Agent, or Firm*—Gerald E. Hespos; Anthony J. Casella (57) ABSTRACT

A coherence microscope has a divider (3) that divides light emitted by a light source (1) into measurement light, which is supplied to and reflected by a specimen (13), and reference light. A superimposition device (25, 31) superimposes the measurement light reflected by the specimen (13) with the reference light. A short sensor array (41) detects the light resulting from the superimposition and permits a read-out rate of at least about 60 kHz. The superimposition device has an emission device (25, 31) for emitting the measurement light and the reference light arranged to effect extensive irradiation of the sensor array (41) with superimposed light. The ratio of distances covered by the measurement light and the reference light from the emission device (25, 31) to impingement points on the sensor array (41) varies in the portion of the sensor array (41) that is irradiated with superimposed light.

24 Claims, 3 Drawing Sheets

COHERENCE MICROSCOPE USING INTERFERENCE OF TIME INCOHERENT LIGHT TO ACHIEVE DEPTH RESOLUTION IN A MEASUREMENT SPECIMEN

BACKGROUND OF THE INVENTION

1. Field of the Invention

The invention concerns a coherence microscope and a method of operating such a microscope.

2. Description of the Related Art

In conventional microscopy problems are involved in the sharp representation of spatially extensive objects. Image sharpness is adversely affected due to blurred contributions of object regions above and below the focal plane. Different apparatuses and methods of imaging spatially extensive objects have therefore been developed.

One method with which sharp images can be obtained from spatially extensive objects utilises a confocal optical system for the imaging procedure. The concept of imaging by means of a confocal optical system is described for example in U.S. Pat. No. 3,013,467. That concept is based on the fact that a light source in point form is made available for example by means of an aperture member with a small hole (pinhole), the light of that light source being focussed on to a point on the specimen. The light reflected by that point on the specimen is in turn focussed on to a point which represents an image of the point of the specimen. Arranged at the location of that image is a second pinhole, behind which is disposed a detector for detecting the reflected light. Only light originating from the focal plane is projected on to a point at the location of the second aperture member and can pass through the pinhole. Light which has been reflected at the specimen in front of or behind the focal plane in contrast forms a disk at the location of the second aperture member. Such light therefore cannot pass through the pinhole so that essentially only light from the focal point reaches the detector. Accordingly images of even spatially extensive objects can be sharply produced by a confocal imaging procedure as contributions from regions of the object which are above or below the focal plane are not involved in the imaging procedure. Slot apertures can also be used instead of pinholes. In that case the image of the light source on the specimen is in the form of a line and the image of the light reflected by the specimen appears as a line on the same or a further slot aperture.

Confocal microscopes, that is to say microscopes based on confocal imaging, are used for example as laser scan microscopes (LSM) in particular in biology, material science and medical diagnostics. In terms of intraoperative diagnostics the particular challenge on the corresponding microscopic scanning method is to be fast, of high resolution and compatible for use in an endoscope. Methods of that kind can be used to effect optical biopsies for tumor detection for example in the gastrointestinal tract.

A confocal laser scan microscope in conjunction with an endoscope is for example the laser scan microendoscope described in Y S Sabharwal et al 'Slit Scanning Confocal Microendoscope for High Resolution In-Vivo Imaging', Appl Opt 34, pages 7133-7144 (1999). That instrument produces the image of a laser beam by means of a confocal aperture member on the specimen, scans the specimen with the laser beam two-dimensionally (laterally) and receives the stray light reflected by the specimen. In order to record a spatial, that is to say three-dimensional image, two-dimensional planes are scanned at various depths. The depth of the plane to be recorded is adjusted by displacement of the focal plane of the microscope in the specimen. The result of that method is a so-called z-stack of two-dimensional images. The scans are either implemented manually (with a high degree of inaccuracy and a lack of reproducibility) or by means of miniaturised focusing devices which must satisfy high demands in terms of accuracy and reproducibility and which in addition are to be only of a small size. The mechanical demands on such focusing devices are very high. Laser scan microendoscopes have therefore not yet become commercial products.

Longitudinal resolution of the laser scan microendoscope is determined by the confocal optical system. Confocal imaging by means of an aperture member provides that only stray light from a longitudinally closely delimited region in respect of depth impinges on the detector. The depthwise extent of that region and thus the longitudinal resolution of the microscope depends on the opening in the aperture member, that is to say for example the hole of the aperture diaphragm, and in practice reaches values of typically less than 10 µm. Better levels of longitudinal resolution, that is to say more narrowly delimited depthwise regions, are possible by further closure of the aperture opening, which however is linked to a high degree of light loss. Disadvantages of the laser scan microendoscope are the long scanning time which is necessary to record a z-stack and a low level of optical sensitivity. Optical sensitivity is adversely affected by the generally low degree of transmission of the optical fiber bundle of the laser scan microendoscope and troublesome reflections at the optical surfaces.

An alternative for imaging spatially extensive objects which is not based on the principle of confocal imaging is the apparatus described in DE 199 29 406 for performing optical coherence tomography (OCT). It includes a light source which emits substantially incoherent light and a beam producing device for producing a measurement light beam and a reference light beam which is coherent with respect to a reference time relative to the measurement light beam, from the incoherent light. The specimen is irradiated with the measurement light beam. The light reflected by the specimen is picked up and spatially superimposed with the reference light beam. Because of the incoherence in respect of time of the radiation, interference phenomena occur in the superimposition operation only with substantially identical optical travel lengths of the measurement light beam and the reference light beam. Therefore different optical travel lengths for the reference light beam result in interference phenomena with measurement light reflected by the object at different depths. Thus the different optical travel lengths of the reference light beam can be related to the depth at which reflection of the measurement light took place in the specimen in order to obtain a depth profile of the specimen.

A disadvantage of the apparatuses set forth is that they cannot be used to implement an optical biopsy in the desired manner.

Therefore the object of the invention is to provide an apparatus with which an optical biopsy can be implemented in a manner which is advantageous in comparison with the state of the art. A further object of the invention is to provide a method of operating such an apparatus.

SUMMARY OF THE INVENTION

According to the invention a coherence microscope includes a light source emitting light which is incoherent in respect of time. In that respect any light source of suitably short coherence length is deemed to be a light source which is incoherent in respect of time. In addition the coherence microscope includes a divider for dividing the light emitted by the light source into measurement light which is supplied to a specimen and reflected thereby, and reference light. The apparatus also has a superimposition device for spatial superimposition of the measurement light reflected by the specimen with the reference light, as well as a sensor line for detection of the light resulting from the superimposition, which is so adapted that it permits a read-out rate of at least about 60 kHz. In order to achieve such read-out rates, it is possible to use in particular short sensor lines with at most about 1000 sensor elements, for example CCD elements (CCD: charge coupled device) and in particular very short sensor lines with at most about 500 sensor elements. The superimposition device has an emission device for emitting the measurement light and the reference light, which is so adapted and arranged relative to the sensor line that extensive irradiation at least of a part of the sensor line with superimposed light is effected and the ratio of the distances covered by the measurement light and the reference light from the emission device to the respective impingement point on the sensor line varies in the portion of the sensor line that is irradiated with superimposed light.

The coherence microprocessor according to the invention is based on the following considerations:

A main obstacle in terms of effecting an optical biopsy with the described state of the art is that the recording times for recording a z-stack are long.

In the LSM, the cause of this is inter alia that, for recording a z-stack, the specimen has to be raster-scanned a plurality of times in succession at different depths, in which case the focal plane of the microscope optical system has to be re-set in each case for varying the depth. The setting operation requires a mechanical movement of optical elements, which cannot be effected at the desired speed. Added to this is the fact that both a high degree of lateral resolution and also a high degree of longitudinal resolution are desired for an optical biopsy. A high degree of longitudinal resolution however requires a reduction in the aperture opening, which results in high light losses.

Just as in the case of the LSM, mechanical movement is also necessary in a standard OCT in order to arrive at items of image information from various depths in the specimen. In apparatuses of that kind, depthwise determination is effected on the basis of the interference of a measurement beam with a reference beam. In that case, the depth from which the image information comes is ascertained from the distance covered by the reference beam to the detector. That distance is usually varied by the reference beam being reflected at a displaceable mirror. Therefore, to alter the depth from which the image information originates, the mirror position must be mechanically altered, which, like the movement of the optical elements in the LSM, cannot be effected at the desired speed.

The so-called line OCT described in DE 199 29 406, unlike a standard OCT, does not require a displaceable mirror in order to ascertain the specimen depth from which the image information originates. In that apparatus the light from the superimposition device is irradiated on to the sensor line in such a way that the distance covered by the reference light beam depends on the impingement point of the light on the sensor line. In that apparatus therefore the specimen depth arises out of the position of the impingement point of the superimposed light on the sensor line, that is to say the position of the sensor element which is respectively read out. Mechanical displacement of the mirror is therefore eliminated.

If in a line OCT the sensor line is selected in such a way that read-out of the sensor line can take place at a high read-out rate, that is to say about 60 kHz or more, then the short recording times necessary for the optical biopsy can be achieved. At the present time sensor lines enjoying the desired read-out rates and a line length of between 128 and 1024 sensor elements are commercially available. The sensor line is therefore preferably a short line which includes not more than about 1000 sensor elements. Particularly if a very high read-out rate is to be achieved, a very short sensor line with not more than about 500 sensor elements is preferably used.

A short or very short sensor line however does not necessarily have to be used. Instead, it is also possible to employ a long sensor line, that is to say a sensor line with more than about 1000 sensor elements, for example a line with 2048 or 4096 sensor elements. In that case the high read-out rate can be achieved by only a respective portion of the sensor elements being irradiated and read out, that is to say the length of the line which is used is less than the actual length of the line. If for example a sensor line with 2048 sensor elements is used, then preferably only about 1000 sensor elements of the line are irradiated and read out. Further preferably only about 500 sensor elements are irradiated and read out.

When reference is made to the length of a sensor line in the description or the claims, that is intended to mean not exclusively the actual length of the line but also the used length of a sensor line whose actual length exceeds the length used.

The short sensor line and the elimination of moved parts for carrying out a depth scan permit the short recording times necessary for an optical biopsy.

In addition to being distinguished by the short recording times the coherence microscope of the invention is also distinguished in particular by the following points, in comparison with the state of the art:

1) In comparison with a laser scan microscope (LSM) the coherence microscope is distinguished by a substantially higher level of signal sensitivity as the detection principle, as in the case of the OCT, is based on the measurement of amplitudes and not on the measurement of intensities. The dynamic range of detection is therefore greater by several orders of magnitude than in a conventional light microscope. That fact is of advantage in particular in terms of use in confocal fiber microscopy which operates with a low signal level.

2) The higher level of signal sensitivity of the coherence microscope has the qualitative advantage over a fiber LSM, in terms of use in confocal fiber microscopy, that both regions of high transparency and also regions of high optical density can be better detected. That property is of particular interest in terms of optical biopsies.

3) In contrast both to the conventional mode of operation of a laser scan microscope and also that of a conventional OCT, a complete longitudinal scan (z-scan) is statically performed with the coherence microscope according to the invention at any point in the lateral specimen plane (XY-plane) at high speed. The recording of z-stacks is therefore not necessary with specimen depths of typically 100 μm.

4) The advantage of static recording of a complete z-scan, referred to in point 3, permits a simplification in the scanning procedure. Instead of a complete XY-scan (a so-called A-scan), the specimen can also be rastered along a XZ-plane, that is to say only scanned along an X-line (a so-called B-scan), in which respect the X-direction is adjustable in its orientation and its 'width' without new positioning of the microscope optical system which is possibly integrated into an endoscope being necessary. That permits a very fast optical biopsy which provides the pathologist with a section in the accustomed orientation. The width of the one-dimensional line can be adapted in particular to the desired resolution and/or the desired signal strength.

The depth region which is accessible for measurement with the optical coherence microscope according to the invention by superimposition of measurement and reference light, that is to say the depth extent of the depth profile resulting from the superimposition, is referred to as the depth variation. The depth variation is independent of depth resolution and is determined by the number of sensor elements in the sensor line, the wavelength of the light used and the number of sensor elements per period of the interference signal.

The coherence microscope is in particular designed in such a way that it has a depth variation which corresponds at least to the depth resolution of the coherence microscope, determined by the coherence length of the light emitted by the light source, and at most $N\lambda/4$, wherein $\lambda$ is the wavelength of the light emitted by the light source and N is the number of sensor elements or the used sensor elements in the sensor line. In that case $N\lambda/4$ represents the greatest depth variation for which the sensor line with N sensor elements or N sensor elements which are used fulfils the scanning theorem when using light of the wavelength $\lambda$.

Typically the depth variation is in the region of about 100 µm but it can also be below that and can be for example 20 µm or less. In particular it can also be in the region of the depth resolution of the coherence microscope. The smaller the depth variation, the correspondingly shorter can be the sensor line used, and thus also the recording time for recording an image.

With the coherence microscope according to the invention, levels of depth resolution of 10 µm over a depth variation of about 100 µm are possible without having to record a z-stack, and that considerably shortens the scanning time for raster scanning of a specimen.

In an advantageous configuration the coherence microscope according to the invention includes a point light source emitting measurement light and at least one confocal aperture member. In that case the point light source can also be formed by the at least one confocal aperture member. In addition, there is a microscope optical system for focusing the measurement light on to the specimen and for focusing the measurement light reflected by the specimen on to the at least one confocal aperture member which possibly at the same time forms the point light source, or a further confocal aperture member. The term confocal aperture member is intended in this respect to denote not only an aperture or slot disk but any confocally arranged optical element having an aperture or numerical aperture.

In the OCT in accordance with the state of the art stray light which originates from others than the depths of the specimen region to be investigated has a disturbing effect on depth measurement. Such stray light is reduced in the coherence microscope according to the invention by the confocal aperture member. Confocality serves in that respect not to increase lateral resolution but to permit measurement in sharply delimited depth regions. It is therefore possible to operate with medium or high apertures or numerical apertures (NA=between 0.1 and 0.5) which effectively block out the unwanted stray light but which nonetheless allow a high level of lateral resolution with which subcellular structures can be recognised.

Preferably the aperture of the at least one confocal aperture member is so selected that the depth variation of the coherence microscope substantially corresponds to the depth extent of its confocal zone.

A further configuration of the coherence microscope has an optical fiber which feeds the measurement light to the microscope optical system. In addition preferably a scanning device is arranged between the optical fiber and the microscope optical system. The at least one confocal aperture member can be formed in that case by the optical fiber. If a monomode fiber is used as the optical fiber, the optical distance covered by the measurement light is established and known with a high level of accuracy.

In still a further configuration of the invention an ordered fiber bundle is connected between the optical fiber and the microscope optical system, preferably between the scanning device and the microscope optical system. In that case the at least one confocal aperture member can alternatively be formed by the optical fiber or by the fibers of the fiber bundle. As recording of z-stacks is not necessary with the coherence microscope according to the invention, no mechanically moved elements are required at the distal end of the fiber. Equally there is no need to implement additional focusing devices at the distal end.

In a particular configuration of the invention the ordered fiber bundle can be integrated into an endoscope. In that case the distal end of the endoscope can include a magnification optical system whose numerical aperture is so selected that the optical resolution at the fiber bundle end face corresponds to the diameter of the fibers of the fiber bundle.

A further configuration of the coherence microscope is distinguished in that there is a scanning device for coupling measurement light into the fibers and/or for coupling measurement light reflected by the specimen out of the fibers. In a particular configuration provided between the scanning device and the proximal end of the ordered fiber bundle is an optical system which is so designed that the light to be coupled into the fibers is slightly defocused at the proximal end of the fiber bundle. It is possible in that way to ensure that each individual fiber is well affected in the same manner when the light is coupled in. Alternatively there can be a scanning control means which is adapted to perform an initialisation operation in which the central position of the fibers at the proximal end of the ordered fiber bundle is ascertained in order to improve the coupling-in effect.

In an advantageous configuration of the invention the fibers of the ordered fiber bundle are arranged linearly in mutually juxtaposed relationship at the proximal end of the fiber bundle. That configuration permits raster scanning with very high scanning frequencies. At the same time it permits surface raster scanning with only one movable scanning element. As the movable scanning element the scanning device can have in particular a rotatable polygonal mirror.

The described operation of coupling the light in and out at the proximal end of the fiber bundle and/or the linear arrangement of the fibers at the proximal end of the fiber bundle can be advantageously used not only in the coherence microscope according to the invention but also in other items of equipment in which light is to be coupled into and out of optical fiber bundles.

The numeral aperture and the magnification of the microscope optical system of the coherence microscope according to the invention can advantageously be so selected that lateral resolution approximately corresponds to the diameter of the fibers of the ordered fiber bundle and a maximum depth variation is reached.

BRIEF DESCRIPTION OF THE DRAWINGS

Further features, properties and advantages of the present invention will be apparent to the man skilled in the art from the following detailed description of embodiments by way of example with reference to the accompanying drawings in which.

DETAILED DESCRIPTION OF THE PREFERRED EMBODIMENTS

Figure 1:
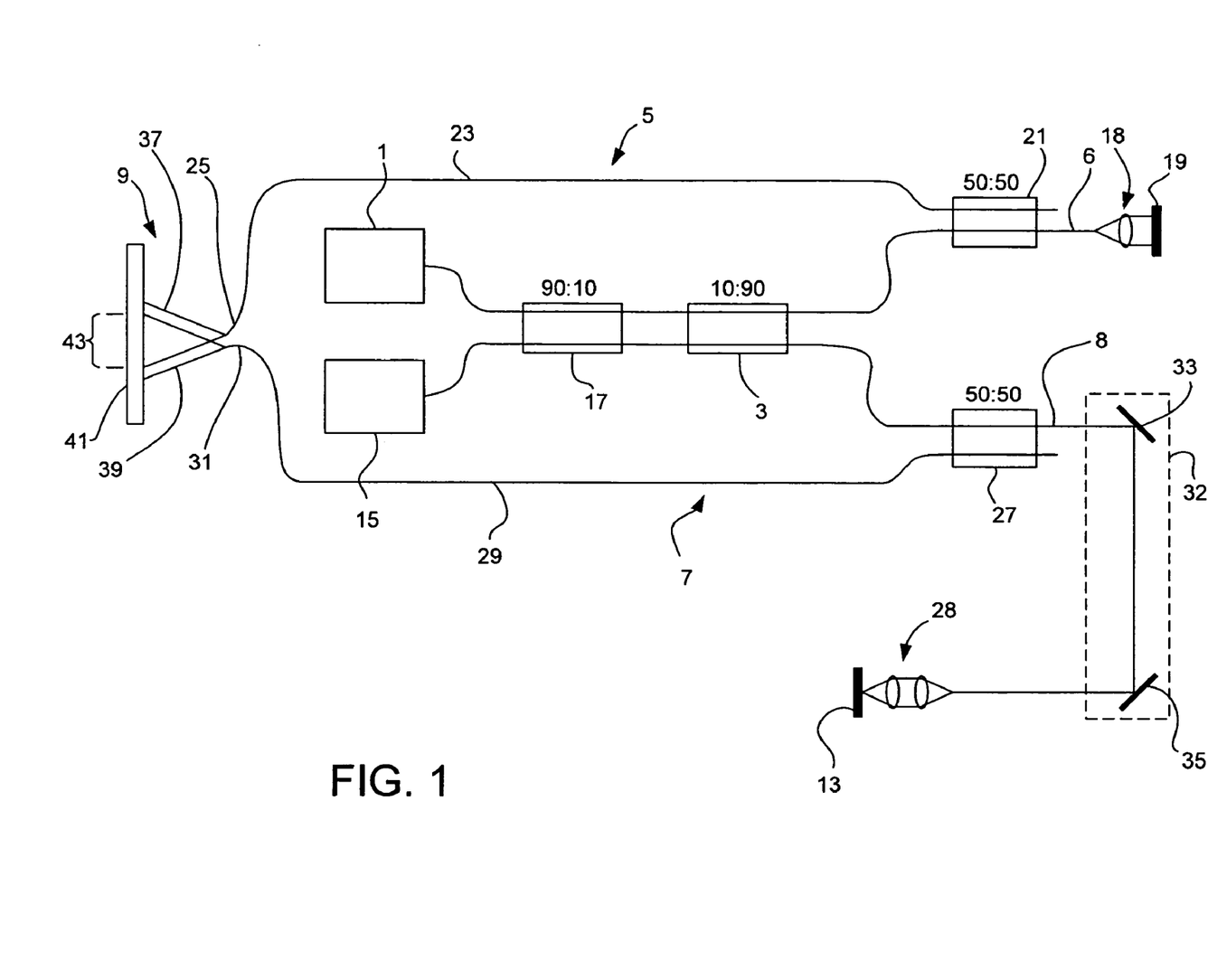
FIG. 1 diagrammatically shows a first embodiment of the coherence microscope according to the invention, FIG. 2 diagrammatically shows a second embodiment of the coherence microscope according to the invention, and FIG. 3 diagrammatically shows light being coupled into and out of fibers of an optical fiber bundle.

Firstly the structure in principle of the coherence microscope according to the invention will be described with reference to FIG. 1. The microscope includes a light source 1 for emitting time-incoherent light, a divider 3 for dividing the light into a reference beam and a measurement beam, a reference branch 5 into which the reference beam is coupled from the divider 3 and in which it covers a defined distance, a measurement branch 7 into which the measurement beam is coupled from the divider and by way of which the measurement beam is supplied to the specimen 13, and a detector 9 in which the measurement light reflected by the specimen is superimposed with reference light from the reference branch 5 and the superimposed light is detected.

The light source 1 is a wide band light source which emits substantially time-incoherent radiation. In the illustrated embodiment the light source 1 is a super-light emitting diode. Alternatively it is also possible to use other light sources if they emit light of a coherence length which does not exceed a predetermined value such as for example a laser emitting short light pulses. The coherence length of the light source 1 determines the depth resolution of the optical coherence microscope. Besides the light source 1 the microscope includes a laser light source 15, for example a laser diode, which emits radiation which is coherent in respect of time, in the frequency range visible to the human eye. The laser light source 15 or the laser light emanating therefrom serves to be able to track the beam path of the light of the super-light emitting diode 1, which is emitted in the non-visible range. For that purpose, the laser light is mixed in a mixer 17 with the light of the super-light emitting diode 1, the mixed beam being 90% from the super-light emitting diode 1 and 10% from the laser light source 15. It will be appreciated that other mixing ratios are also possible. The radiation produced by the mixer 17 is coupled by the divider 3 90% into the measurement branch and 10% into the reference branch. In this respect also other mixing ratios are possible.

The reference light beam is coupled into a reference light guide 6 in the reference branch 5 and passed to a mirror 19 by way of an optical system 18. The mirror 19 reflects the reference beam which after reflection is coupled by the optical system 18 into the reference light guide 6 again. A mixer 21 mixes the reflected reference light with the reference beam coming from the divider 3 in a 50:50 ratio and couples the light which is processed in that way into a further reference light guide 23 which leads to the detector 9 and which passes the reference light beam to a beam exit 25 of the reference branch 5. The reference light guides are preferably monomode fibers.

The measurement light is passed by way of a measurement light guide 8 arranged in the measurement branch 7 to a scanning device 32 by which it is directed on to a microscope optical system 28 for focusing the measurement light beam on to a region of the specimen. The scanning device 32 includes a first galvanometer mirror 33 pivotable about an axis for ascertaining an X-deflection of the measurement beam and a second galvanometer mirror 35 pivotable about an axis for ascertaining a Y-deflection of the measurement beam.

The axes about which the respective galvanometer mirrors 33, 35 are pivotable are preferably in mutually perpendicular relationship but can also assume other angles relative to each other as long as they are not in mutually parallel relationship. The galvanometer mirrors 33, 35 are controlled by means of a scanning control means (not shown) in such a way that a lateral specimen region is scanned step by step. In that case, in each scanning step, the light reflected by the specimen 13 is received by the microscope optical system 28 and fed to the measurement light guide 8 again by way of the scanning device 32.

The numerical aperture NA of the measurement light guide 8 represents both a point light source and also a confocal aperture member of the coherence microscope. The numerical aperture and the magnification of the microscope optical system are advantageously so selected in that respect that the natural resolution of the microscope approximately corresponds to the diameter of a fiber (typically between 1 and 10 μm) and a maximum axial sharpness range is achieved. If the numerical aperture of a fiber is for example NA=0.18 an axial sharpness range of $4\lambda/NA^2=100$ μm is reached and a lateral resolution of 0.5 μ/NA=2.2 is attained.

A mixer 27 to which the measurement light is passed by way of the measurement light guide 8 mixes the measurement light reflected by the specimen in a 50:50 ratio. The measurement light when processed in that way is coupled by the mixer 27 into a further measurement light guide 29, also preferably a monomode fiber, which passes the measurement light to the beam exit 31 of the measurement branch 7.

From the beam exits 25, 31 of the reference branch 5 and the measurement branch 7 respectively the reference light and the measurement light are directed in the form of light cones 37, 39 on to a CCD line 41 as the sensor line of the detector 9, which represents the sensor surface of the detector 9. The two beam exits 25, 31 are arranged at a mutual spacing so that the two light cones are partially superimposed and simultaneously illuminate at least a partial region 43 of the CCD line 41. In the present embodiment the CCD line has 512 pixels which are essentially all irradiated by superimposed light. Interference phenomena occur only if the measurement light arriving at a point, that is to say a pixel, of the CCD line 41 has covered the same distance as the reference light arriving at the same point of the CCD line 41. A depth within the specimen 13 can be associated with the respective point on the CCD line 41, from the known distances which the reference light has covered from the beam exit 25 to the respective points on the CCD line. Only measurement light which has been reflected at that depth interferes with the reference light at the associated point of the CCD line 41.

A read-out unit (not shown) reads out the CCD line and transmits the read-out data to an evaluation unit (also not shown) which effects the association of a pixel with the specimen depth from which the measurement light impinging on the pixel originates. The operation of reading out the CCD line can be effected with a high read-out rate by virtue of the relatively low number of pixels which are to be read out.

In the described embodiment the high read-out rate can also be achieved if for example instead of a CCD line with 512 pixels, a CCD line with 1024 or more pixels is used, of which only about 500 are irradiated with superimposed light and read out.

The recordings of the coherence microscope according to the invention are distinguished in that a volume with an axial extent in the region of the depth of focus of the confocal microscope optical system is measured at a given depth of the specimen. As the specimen is scanned in surface mode in the lateral direction, very high data rates are involved. The overall system should therefore be designed and optimised for fast data detection. The read-out rate of the CCD line which is necessary for that purpose is estimated hereinafter:

The depth variation $\Delta z$ of the coherence microscope is given by:

$$\Delta z = N\lambda/2P,$$

wherein N is the number of pixels of the CCD line, $\lambda$ is the wavelength of the light source (typically 800 mm) and P is the number of pixels per period of the interference signal. The number of pixels per period should be at least P=2 in order to comply with the scanning theorem. If the arrangement is compared to a laser scan microscope, then the number of recorded pixels in the lateral direction (X, Y) should typically be 250×250=62500. With a 3D image frequency of 1 Hz the CCD line consequently must be read out at a line frequency of 62.5 kHz. The length of the CCD line, for a depth variation of $\Delta z$=100 µm and a period of 2, is N=500. With a smaller depth variation the number of pixels per period can also be higher than 2; without a longer line having to be used. Alternatively however with a smaller depth variation the number of pixels per period can also be maintained and in return the length of the CCD line can be reduced. As mentioned the number of pixels per period should be at least 2 and should advantageously be at most 4 in order to avoid unnecessarily long lines.

In the coherence microscope according to the invention, as in the case of the OCT, depth resolution is determined by the coherence length of the light source 1. Each light source emits coherent light over a given period of time, namely over the coherence time. In that respect light sources with very short coherence times are viewed as being time-incoherent light sources. The coherence time can be converted into a coherence length. Only those light beams whose distances covered differ by less than the coherence length can interfere with each other. The shorter the coherence length, the correspondingly more precisely must the distances covered by the measurement beam and the reference beam therefore coincide so that they can interfere with each other, that is to say the difference in distances must be less than the coherence length. In the case of a relatively short coherence length therefore it is possible to more accurately ascertain the depth region from which the measurement beam was reflected, and that therefore permits better depth resolution for the microscope. Levels of depth resolution of 10 µm can be achieved with the coherence lengths of common incoherent light sources. With modern light sources it is possible to achieve levels of resolution to below 1 µm. Preferably the depth resolution of the coherence microscope is better than 20 µm, further preferably better than 10 µm and in particular better than 1 µm, in which respect depth resolution can depend on the desired use of the coherence microscope.

Further details of the structure of the detector, detection and ascertainment of the depth profile from the levels of intensity detected by the CCD line are described in DE 199 29 406, to the disclosure of which reference is directed in this connection.

The volume $\Delta X$, $\Delta Y$, $\Delta Z$ of the scattering specimen 13 can be measured with a high level of lateral (X, Y) and axial (Z) resolution with the coherence microscope. The specimen 13 is raster scanned similarly to the confocal laser scan microscope with the confocal microscope optical system. In the coherence microscope according to the invention however the confocality is not used as in the case of the confocal laser scan microscope to increase the degree of lateral resolution or to permit measurement in sharply delimited depth regions (<10 µm). Instead, confocality is used only to reduce extraneous light which originates from outside the specimen region to be investigated.

In alternative configurations of the coherence microscope according to the invention, in particular the scanning device 32, the galvanometer mirrors 33, 35 can be replaced entirely or partially by other scanning elements such as for example rotatable polygonal mirrors.

Figure 2:
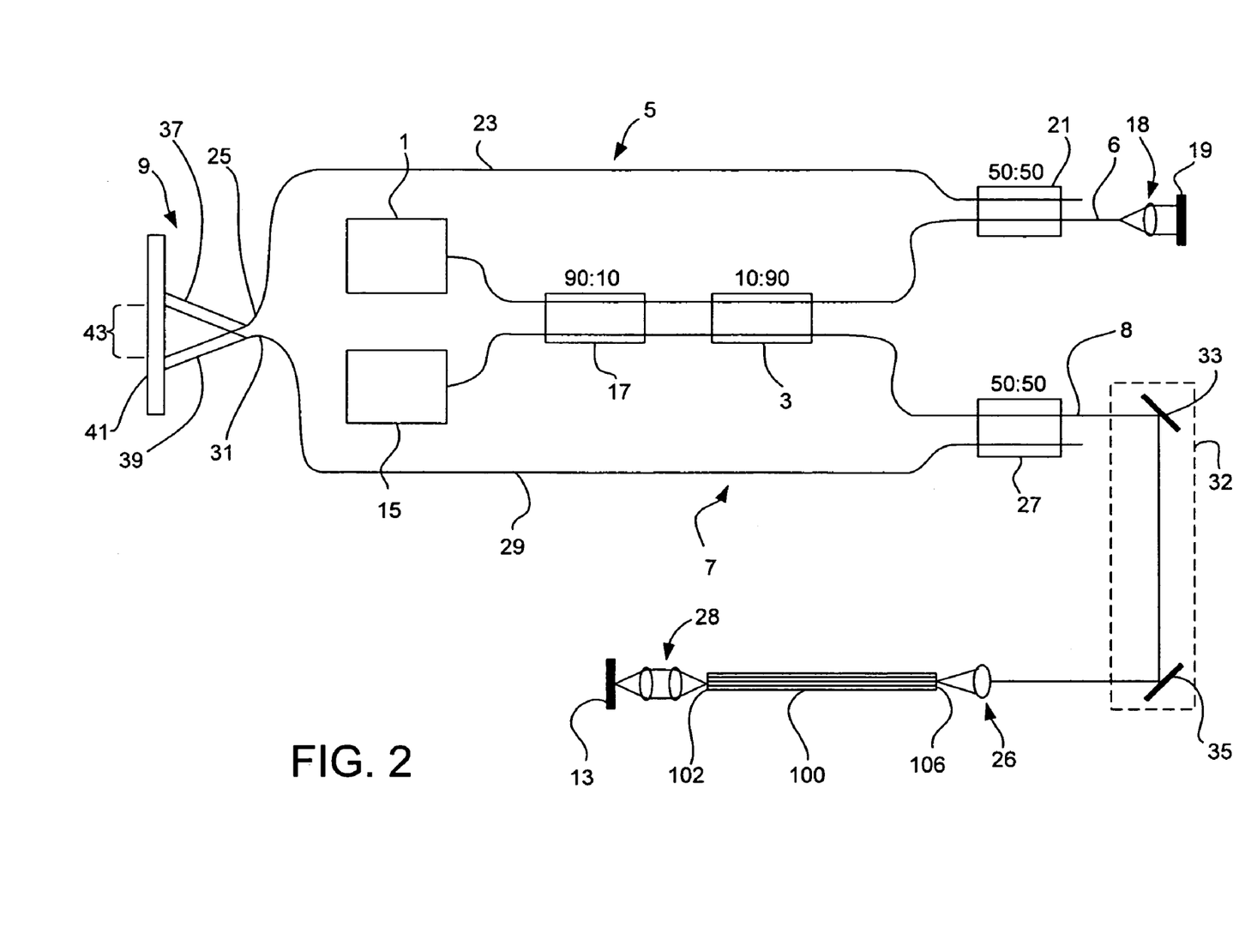

A second embodiment of the coherence microscope according to the invention is shown in FIG. 2. It differs from the first embodiment only in that disposed between the scanning device 32 and the microscope optical system 28 is a focusing lens 26 and an ordered fiber bundle 100 which includes a number of optical fibers, preferably monomode fibers.

The measurement light is passed to the microscope optical system 28 by way of the fiber bundle 100. Introduction of the measurement light beam into the proximal ends 106 of the optical fibers of the fiber bundle 100 is effected by way of the focusing lens 26 with which the measurement light beam is focused on to the entry faces of the fibers. The scanning device 32 which is designed as in the first embodiment makes it possible in that respect for the measurement light beam to be directed on to the focusing lens 26 in such a way that it is focused on to the proximal end of a selected fiber of the fiber bundle 100. The galvanometer mirrors 33, 35 of the scanning device 32 are controlled by means of a scanning control means (not shown) in such a way that the measurement light beam is successively introduced into all fibers or at least into a defined subset of all fibers of the optical fiber bundle.

Coupling of the measurement light beam into the proximal ends of the individual fibers of the ordered fiber bundle 100 can be improved in a number of ways in order to achieve optimum coupling into the individual fibers with maximum scanning speed.

A possible way of improving coupling in the light, which is to be implemented without major expenditure, provides that the light beam which is to be coupled into the fiber bundle 10 is not completely focused by means of the focusing lens 26 but is slightly defocused so that, at the location of a fiber into which it is to be coupled, the area of the defocused measurement light beam is somewhat larger than the entry faces of the fibers. It is possible in that way to ensure that each individual fiber is well involved in the same manner. Defocusing however involves a signal loss which is not acceptable in all uses.

An alternative possible way of improving the coupling-in effect is to control the scanning device 32 in such a way that each individual fiber of the fiber bundle 100 is optimally hit by the rastering light beam. The optimum setting for the scanning device is ascertained in an initialisation step for each individual fiber. In the initialisation step for example the proximal end 106 of the fiber bundle can be raster scanned in a raster which is finer than that which arises out of the arrangement of the proximal ends of the individual fibers. The reflections which occur upon raster scanning at the proximal end 106 of the fiber bundle 100 are stronger if they originate from an individual fiber than if they originate from the surrounding material in which the individual fibers are embedded. It is therefore possible to ascertain the exact position of the individual fibers by measurement of the reflections. Actuation by the scanning control means is then effected on the basis of the positions ascertained in the initialisation step. By virtue of the fact that the reflections of the individual fibers are stronger than those of the surrounding material it is possible for the reflections also to be used for synchronisation of data recording.

Arranged at the distal end 102 of the fiber bundle is a confocal microscope optical system 28 with which the measurement light issuing from the fibers of the fiber bundle 100 is focused on to the specimen 13. In addition, the microscope optical system 28 provides that the light reflected by the specimen 13 is again focused on to the distal end of that fiber of the fiber bundle 100, from which it issued. The distal end of the fiber, that is to say its numerical aperture, represents in that case both the point light source and also the confocal aperture member of the confocal optical system. In this embodiment also it is advantageous if the numeral aperture and the magnification of the microscope optical system are so selected that the lateral resolution of the microscope approximately corresponds to the diameter of a fiber (typically 1 to 100 μm) and a maximum axial sharpness range is achieved.

Instead of being given by the numerical aperture of an individual fiber of the fiber bundle 100 the confocal aperture member, in the second embodiment, can also be given by the numerical aperture of the measurement light guide 8.

The measurement light reflected by the specimen 13 is passed by way of the fiber bundle 100 and the galvanometer mirrors 33, 35 of the scanning device 32 to a mixer 37 arranged in the measurement branch 7. The mixer 27 mixes the measurement light reflected by the specimen 13 with the light originating from the divider 3 in a 50:50 ratio. The measurement light processed in that way is coupled into a measurement light guide 29, preferably a monomode fiber, which passes the measurement light to the beam exit 31 of the measurement branch 7. Superimposition of the measurement light with the reference light and detection of the superimposed light are then effected as in the first embodiment.

Figure 3:
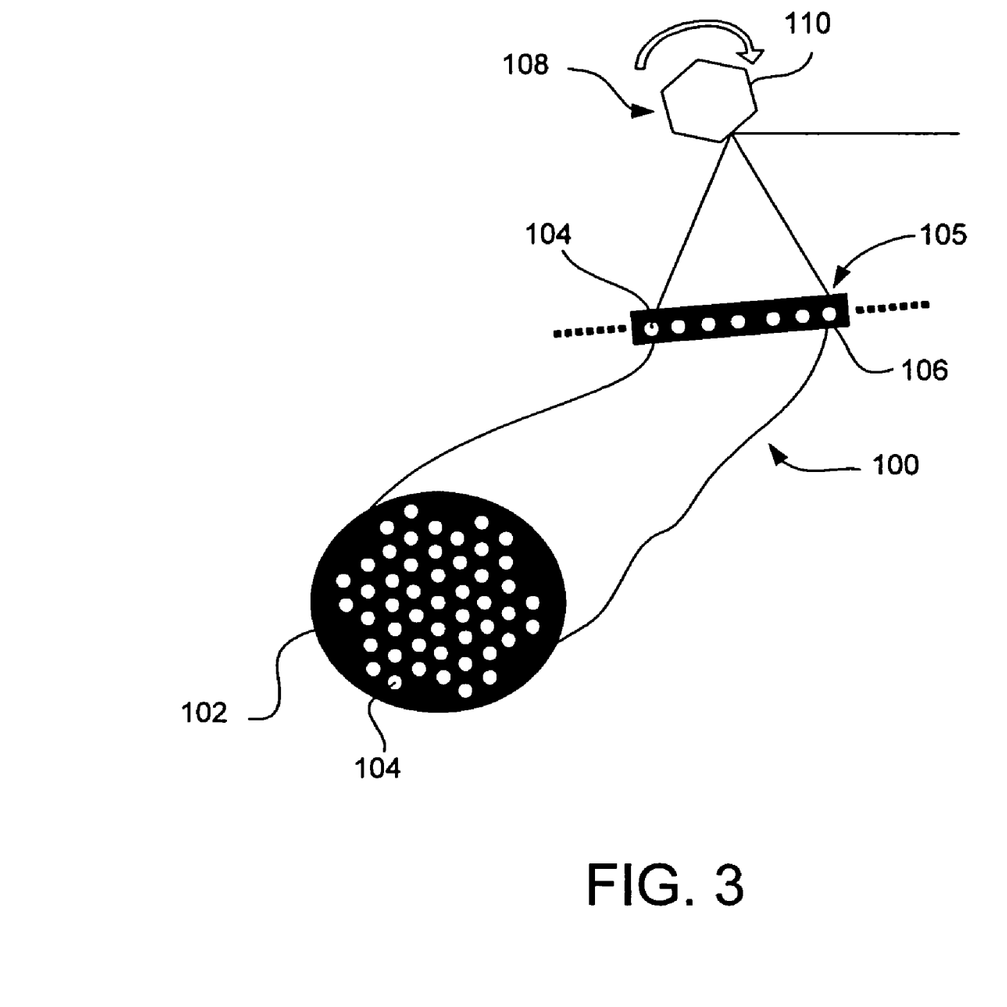

An alternative embodiment of the scanning device 32 and the optical fiber bundle 100 is now described with reference to FIG. 3. At its distal end 102 the optical fiber bundle 100 has the usual, almost hexagonal arrangement of the individual fibers 104. Unlike the usual fiber bundles the individual fibers 104 at the proximal end 106 of the fiber bundle 100 are however arranged in a line 105. If the fiber bundle includes for example 50,000 individual fibers which are linearly arranged at a spacing of 4 μm, the extent of the line 105 is 20 cm.

The scanning device 32 for scanning the fiber line 105 at the proximal end 106 of the fiber bundle 100 includes a rotatable polygonal mirror 108 with a number of reflecting polygon surfaces 110, the axis of rotation of which extends perpendicularly to the direction in which the fiber line extends. The measurement light beam is deflected by the reflecting polygon surfaces 110 in a direction towards the individual fibers 104 of the line 105. The arrangement of the polygonal mirror 108 relative to the fiber line 105 is so selected that the line 105 is raster scanned during a full revolution of the polygonal mirror 108 as often as the polygonal mirror 108 has polygon surfaces 110. The line configuration of the proximal end 106 of the fiber bundle 100, that is to say the linear arrangement of the individual fibers, thus permits a novel method of surface scanning in which deflection of the measurement light beam for carrying out the surface scan is effected only in one direction. Raster scanning of the line by means of the polygonal mirror 108 permits very high scanning frequencies.

A complete depth profile is recorded with the coherence microscope at any point of the XY-plane (the so-called A-scan) without longitudinal scanning (z-scan) occurring. For specimens in which only a small depth region is to be recorded, it is possible to use a short CCD line or a long CCD line of which in each case only a short partial region is read out. The short line or the short partial region can be read out for performing an A-scan at a high line frequency. In that way it is possible to achieve very high measurement speeds when performing such scans.

The coherence microscope according to the invention permits a simplification in the scanning procedure. Instead of a complete XY-scan, for example by means of an endoscope, the specimen is scanned along an XZ-plane, that is to say only along an X-line (the so-called B-scan). The X-direction can be adjusted both in its orientation and also in its 'width' without fresh positioning of the optical system, for example of the endoscope, being necessary. That method permits the pathologist to perform a very fast optical biopsy which supplies a section in the accustomed orientation. In particular the width of the one-dimensional line can be adapted to the desired resolution and/or the desired signal strength.

Essential areas of use of the coherence microscope according to the invention are in optical biopsy and in in-vivo histology. The described method is suitable for external uses (investigations on the skin and the mucous membranes), for endoscopic diagnosis methods, in particular in the gastrointestinal tract, and for ophthalmology investigations at the retina.

The invention claimed is:

1. A coherence microscope including:
   a light source (1) emitting time-incoherent light,
   a divider (3) for dividing the light emitted by the light source (1) into measurement light which is supplied to a specimen (13) and reflected thereby, and reference light;
   a point light source emitting the measurement light onto the specimen (13) and at least one confocal aperture member;
   a microscope optical system (28) for focusing the measurement light on the specimen (13) and for focusing the measurement light reflected by the specimen on the at least one confocal aperture member, wherein the aperture of the at least one confocal aperture member is so selected that the depth extent of the confocal zone substantially corresponds to the depth stroke of the coherence microscope;
   a superimposition device (25, 31) for spatially superimposing the measurement light reflected by the specimen (13) with the reference light; and
   a sensor line (41) including a predetermined number of sensor elements for detecting the light resulting from the superimposition, the predetermined number of sensor elements being selected so a read-out rate of at least 60 kHz is achieved;
   wherein
   the superimposition device has an emission device (25, 31) for emitting the measurement light and the reference light which is adapted and arranged relative to the sensor line (41) such that extensive irradiation at least of a part of the sensor line (41) with superimposed light is effected and the ratio of the distances covered by the measurement light and the reference light from the emission device (25, 31) to the respective impingement point on the sensor line (41) varies in the portion of the sensor line (41), that is irradiated with superimposed light.

2. A coherence microscope as set forth in claim 1 characterised in that the sensor line (41) includes not more than about 1000 sensor elements.

3. A coherence microscope as set forth in claim 1 characterised in that the sensor line (41) includes not more than about 500 sensor elements.

4. A coherence microscope as set forth in claim 1 characterised in that it has a depth variation which corresponds at least to the depth resolution of the coherence microscope and at most $N\lambda/4$, wherein $\lambda$ is the wavelength of the light emitted by the light source (1) and N is the number of sensor elements in the sensor line (41).

5. A coherence microscope as set forth in claim 4 characterised in that its depth variation is 100 μm or less.

6. A coherence microscope as set forth in claim 5 characterised in that its depth variation is 20 μm or less.

7. A coherence microscope as set forth in claim 4 characterised in that its depth variation substantially corresponds to its depth resolution.

8. A coherence microscope as set forth in claim 1 characterised in that there is an optical fiber (8) which feeds the measurement light to the microscope optical system (28).

9. A coherence microscope as set forth in claim 8 characterised in that the optical fiber (8) is a monomode fiber.

10. A coherence microscope as set forth in claim 8 characterised in that the at least one confocal aperture member is formed by the optical fiber (8).

11. A coherence microscope as set forth in claim 8 characterised in that an ordered fiber bundle (100) is interposed between the optical fiber (8) and the microscope optical system.

12. A coherence microscope as set forth in claim 11 characterised in that the at least one confocal aperture member is formed by the optical fiber (8) or by the fibers (104) of the fiber bundle (100).

13. A coherence microscope as set forth in claim 11 characterised in that the ordered fiber bundle (100) is integrated into an endoscope.

14. A coherence microscope as set forth in claim 13 characterised in that the microscope optical system (28) is arranged at the distal end of the endoscope.

15. A coherence microscope as set forth in claim 11 characterised in that the numerical aperture and the magnification of the microscope optical system (28) are so selected that the optical resolution at the fiber bundle end face corresponds to the diameter of the fibers (104) of the ordered fiber bundle (100).

16. A coherence microscope as set forth in claim 15 characterised in that there is provided a scanning device (32; 108) for coupling measurement light into the fibers (104) of the ordered fiber bundle (100) and/or for coupling measurement light reflected by the specimen (13) out of the fibers (104).

17. A coherence microscope as set forth in claim 16 characterised in that provided between the scanning device (32, 108) and the proximal end (106) of the ordered fiber bundle (100) is an optical system (26) which is so designed that it slightly defocuses the light which is to be coupled into the fibers (104) at the proximal end (106) of the fiber bundle (100).

18. A coherence microscope as set forth in claim 16 characterised in that there is provided a scanning control means which is adapted to perform an initialisation step in which the central position of the fibers (104) at the proximal end (106) of the ordered fiber bundle is ascertained.

19. A coherence microscope as set forth in claim 16 characterised in that the fibers (104) of the ordered fiber bundle (100) are arranged in linearly mutually juxtaposed relationship at the proximal end (106) thereof.

20. A coherence microscope as set forth in claim 19 characterised in that the scanning device (32) includes a rotatable polygonal mirror (108).

21. A coherence microscope as set forth in claim 11 characterised in that the numerical aperture and the magnification of the microscope optical system (28) are so selected that the lateral resolution approximately corresponds to the diameter of the fibers (104) of the ordered fiber bundle (100) and a maximum depth variation is achieved.

22. A coherence microscope as set forth in claim 1 characterised in that the sensor line (41) includes at least 1000 sensor elements and wherein not more than about 1000 sensor elements are used.

23. A coherence microscope as set forth in claim 1 characterised in that the sensor line (41) includes at least 500 sensor elements and wherein not more than about 500 sensor elements are used.

24. A coherence microscope comprising:

a light source (1) emitting time-incoherent light, a divider (3) for dividing the light emitted by the light source (1) into measurement light which is supplied to a specimen (13) and reflected thereby, and reference light;

a superimposition device (25, 31) for spatially superimposing the measurement light reflected by the specimen (13) with the reference light;

a short sensor line (41) or a long sensor line only a portion of the sensor elements of which are used for detecting the light resulting from the superimposition, the sensor line being so short or only such a portion of sensor elements is used that a read-out rate of at least 60 kHz is achieved;

an emission device (25, 31) for emitting the measurement light and the reference light from the superimposition device, the emission device being adapted and arranged relative to the sensor line (41) such that extensive irradiation at least of a part of the sensor line (41) with superimposed light is effected and the ratio of the distances covered by the measurement light and the reference light from the emission device (25, 31) to the respective impingement point on the sensor line (41) varies in the portion of the sensor line (41), that is irradiated with superimposed light;

a point light source emitting the measurement light onto the specimen (13) and at least one confocal aperture member;

a microscope optical system (28) for focusing the measurement light onto the specimen (13) and for focusing the measurement light reflected by the specimen on the at least one confocal aperture member;

an optical fiber (8) which feeds the measurement light to the microscope optical system (28) and an ordered fiber bundle (100) which is interposed between the optical fiber (8) and the microscope optical system (28), the fibers (104) of the ordered fiber bundle (100) being arranged in linearly mutually juxtaposed relationship at the proximal end (106) thereof; and a scanning device including a rotatable polygonal mirror (108) for coupling measurement light into the fibers (104) of the ordered fiber bundle (100) and/or for coupling measurement light reflected by the specimen (13) out of the fibers (104).

* * * * *